Oct. 13, 1931.    R. W. BRANSON    1,827,457
PARKING DEVICE
Filed June 13, 1929    3 Sheets-Sheet 1
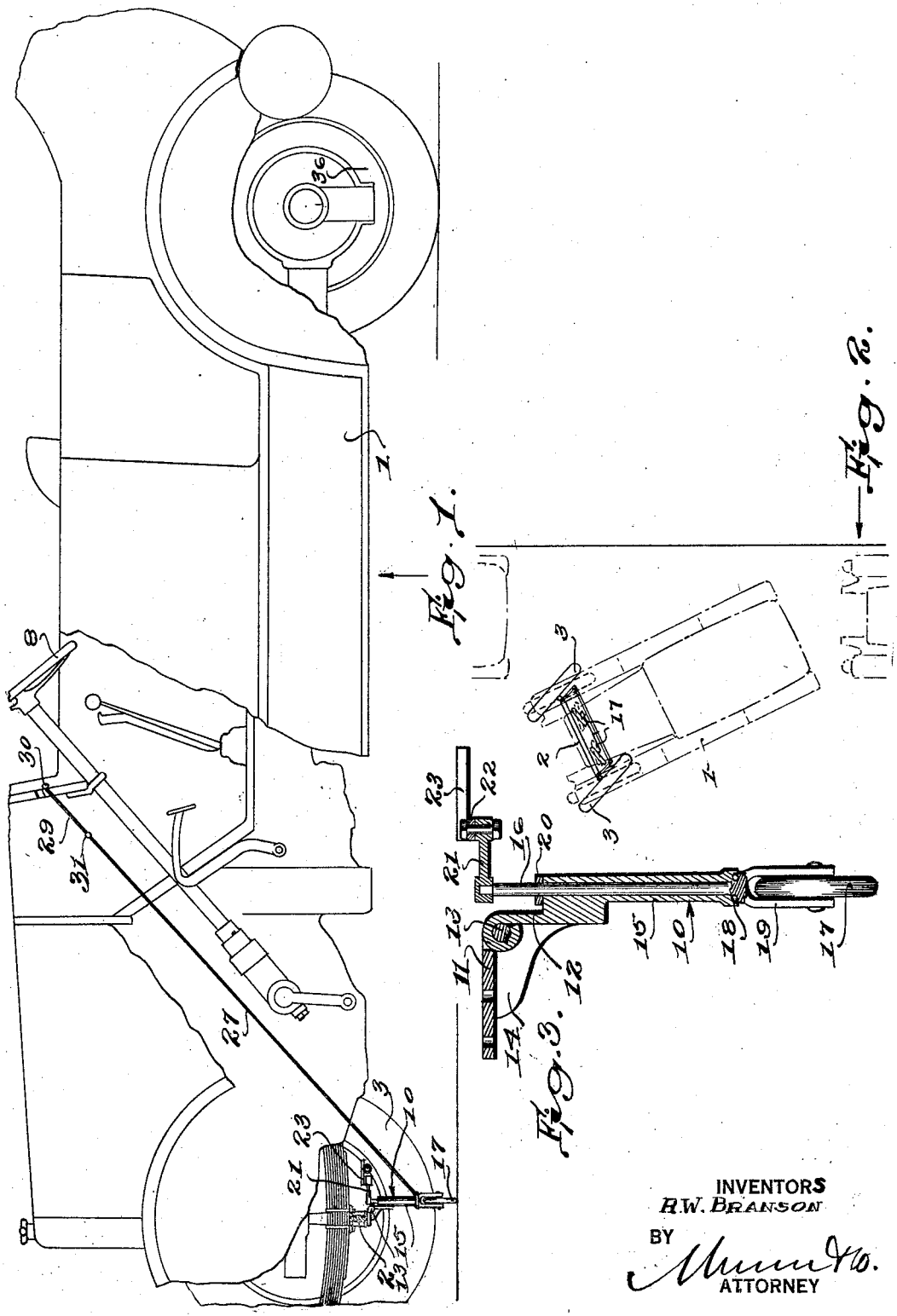
INVENTORS
R. W. BRANSON
BY
ATTORNEY

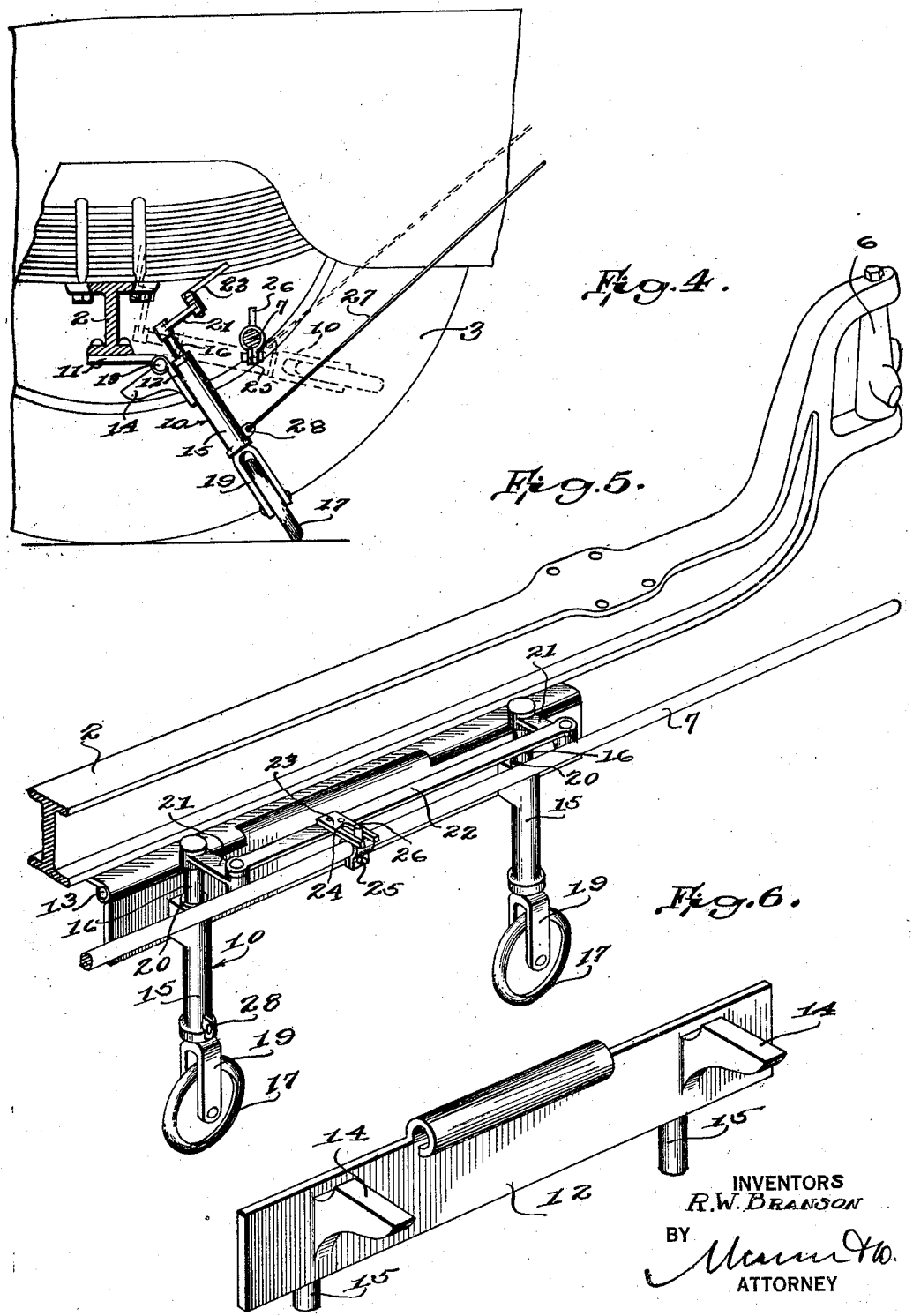

Oct. 13, 1931.    R. W. BRANSON    1,827,457
PARKING DEVICE
Filed June 13, 1929    3 Sheets-Sheet 3
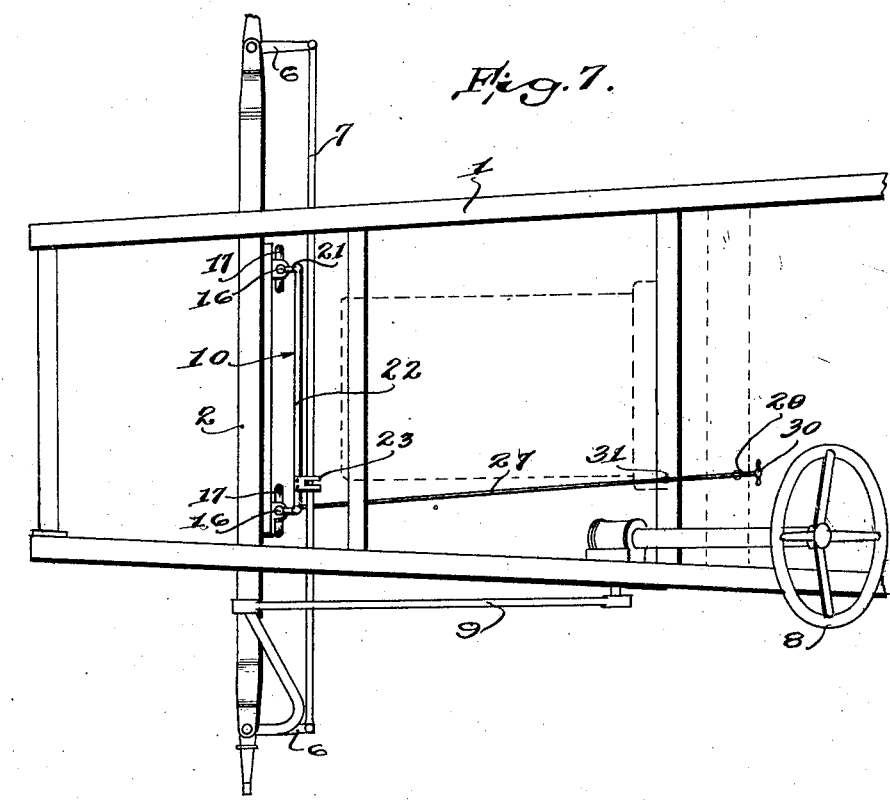
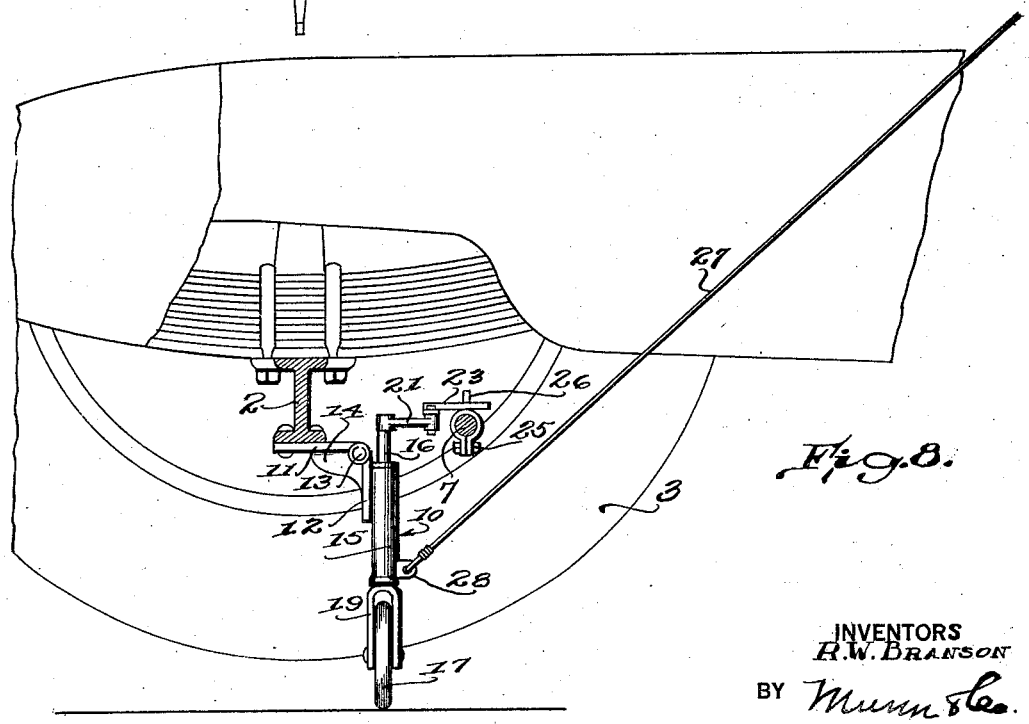
INVENTORS
R. W. BRANSON
BY Munn &Co.
ATTORNEY Patented Oct. 13, 1931

1,827,457

UNITED STATES PATENT OFFICE

RUSSELL WILSON BRANSON, OF KANSAS CITY, MISSOURI, ASSIGNOR OF ONE-HALF TO JOHN E. SCHULTZ, OF GROESBECK, TEXAS

PARKING DEVICE

Application filed June 13, 1929. Serial No. 370,637.

This invention relates to improvements in automobiles and like vehicles, a particular purpose being to improve the parking device by which the automobile may be manœuvred in cramped quarters, and it consists of the constructions, combinations and arrangements herein described and claimed.

An object of the invention is to provide sets of auxiliary wheels in association with the front axle of an automobile, designed to be let down and shifted for the purpose of lifting the front wheels of the automobile from the ground.

Another object of the invention is to provide auxiliary wheels for the front axle of the automobile, arranged to make connection with the drag link when let down and shifted to support the front wheels of the automobile from the ground, thus to permit limited turning of the front wheel steering knuckles simultaneously with the shafts of the auxiliary wheels and make a better job of a parking operation.

Other objects and advantages will appear in the following specification, reference being had to the accompanying drawings, in which:—

Figure 1 is a diagrammatic view showing the improved auxiliary wheels in use for the purpose of supporting the front automobile wheels above the ground;

Figure 2 is a diagram illustrating a parking operation later described in detail;

Figure 3 is a vertical section of the front frame, being so taken as to reveal one of the auxiliary wheel shafts;

Figure 4 is a detail view illustrating several positions of the front auxiliary wheels;

Figure 5 is a perspective view of a portion of the front axle, the front frame being shown in the dropped position;

Figure 6 is a detail perspective view of the movable hinge leaf;

Figure 7 is a plan view of the front part of the chassis, illustrating the location of the front auxliary wheels;

Figure 8 is a view on the order of Figure 5 showing the front frame and auxiliary wheels in that shifted position wherein the front wheels are raised from the ground.

From a patient observation of current developments of the problem concerning the regulation of traffic, one is inclined toward the conclusion that the solution rests with the close parking of motor vehicles along curbs and other spaces allotted to the purpose, as much as with any other factor. Parking spaces, such as are afforded by relatively large open lots and the like, are few and far between, and certainly are not accessible to a large majority of motorists.

Those of the latter who must take their automobiles into the busy sections of the city must be content with such parking spaces as the curb may afford, and it requires no keen observer to see that such spaces are at a premium during the greater part of the working day. Nor does it require a keen observer to see that much valuable space is wasted by the injudicious parking of cars.

Many motorists, out of a desire to leave themselves plenty of room in the event of retiring from the curb, will so locate their cars in a given space that the room left at the front and rear could accommodate another car if properly disposed. Knowing that the foregoing condition is probably brought about more by a lack of skill in parking than by a disposition to take more than is coming to the average motorist, the herein disclosed invention has been devised to enable the former to get into a space that is little more than large enough to accommodate his car.

Reference is made to the drawings. Those parts that are familiar in the conventional automobile and with which the invention is concerned comprise the following: the chassis 1, front axle 2, front wheels 3, steering knuckles 6, drag link 7, steering wheel 8, and thrust rod 9.

A front frame, generally designated 10 comprises the leaves 11 and 12 of a hinge, the former of which is permanently secured in any appropriate manner to the front axle 2. The leaves are connected by a hinge pin 13. The movable leaf 12 has one or more lugs 14 (Fig. 6) that will engage the adjacent surface of the fixed leaf 11 (Fig. 8) to limit the rocking movement of the frame 10 in one direction when in one shifted position, at which time the front wheels 3 are raised from the ground.

Attached to the movable leaf 12 are tubular casings 15 in which the shafts 16 of a set of front auxiliary wheels 17 are suitably journaled. Ball thrust bearings 18, such as seen in Figure 3, may be employed.

The lower ends of the shafts have forks 19 in which the wheels have bearing. A collar 20, or other suitable devices, retain each shaft in position. The upper exposed end of each shaft has a crank 21.

The cranks are connected by a bar 22. The connection is pivotal so that endwise motion imparted to the bar will result in simultaneous turning movement of the shafts 16. An arm 23 with a slot 24 is attached to the connecting bar 22 and extends in the rearward direction. A clamp 25, secured to the drag link 7, has an upstanding pin 26. The pin enters the slot when the frame 10 is shifted to the upright position in Figure 8 after having been dropped to the ground as in Figure 4 and the automobile has been backed slightly.

It is then that the operator may turn the steering wheel 8 and turn the auxiliary wheel shafts 16 simultaneously with the front wheel knuckles 6. The turning will be slight, but enough to enable manœuvring of the automobile into restricted spaces according to the principle pictured in Figure 2 and described more in detail later.

A cable 27, or its equivalent, permits dropping the frame 10 and pulling it up again. One end of the cable is attached to an eye 28 on one of the casings 15. The other end of the cable connects with a staff 29 that is operable through the dash board. The staff has a handle 30. A slight knuckle 31 is formed where the staff joins the cable, the position of the former being such that the raised position of the frame 10 (dotted lines Figure 4) will correspond with a position of the knuckle just in front of the dash board, the dropping of the staff 29 (using the knuckle as a hinge) producing an entirely adequate hold for the frame in the position mentioned.

The operation is readily understood. Under ordinary circumstances, as when the automobile is running along, the front frame 10 will be held elevated under the chassis 1. The dotted lines in Figure 4 illustrate the position. Assume that it is desired to manœuvre the automobile into a narrow space as in Figure 2. The preliminary backing of the vehicle will bring it approximately to the position shown. That act will leave the front wheels 3 in a position at a decided angle with respect to the chassis. That angle must be determined, for it is only at one position of the drag link 7 relative to the connecting bar 22 that the slot 24 of the arm 23 can receive the pin 26. It is desirable to bring the front wheels in so that they will not project out into the street possibly to be struck by a reckless driver.

Having gotten the vehicle in as far as possible with the ordinary facilities, the operator drops the front frame to the full line position shown in Figure 4. He has to back the vehicle but slightly (several inches) to bring the frame 10 to the upright position in Figure 1. The lugs 14 limit the rocking movement of the frame. The action raises the front wheels 3 from the ground. The auxiliary wheels 17 generally stand at right angles to the vehicle, so that it would now be possible for the operator to get out and push the front end of the vehicle in toward the curb, the rear wheels 5 acting as a pivot.

But it is here that the steering wheel 8 performs a function. The dropping of the frame 10 and the erection thereof by the slight backing of the vehicle, bring the pin 26 of the drag link 7 and the slotted arm 23 of the connecting bar 22 into engagement so that turning of the steering wheel 8 makes it possible to simultaneously turn the steering knuckles 6 of the front wheels 3 and the auxiliary wheels 17.

Turning of the auxiliary wheels 17 into the dotted line positions in Figure 2 will enable the movement of the front end of the vehicle toward the curb more sharply and directly than would be possible were the mere swinging of the front end on the arc of a circle to be relied upon. By tracing the movement of the drag link 7 it will be found that the shifting of the auxiliary wheels 17 to the dotted line position will be accomplished by a shifting of the wheels 3 to the dotted line positions in line with the sides of the car, so that, by the time the vehicle has been manœuvred to the curb the front wheels will occupy a desirable position in substantial parallelism with the rear wheels, and will not jut out to act as obstructions to passing traffic.

It is possible that the auxiliary wheels may render the automobile burglar proof. Without having access to the controls on the inside of the car it would not be so easy to displace the front frame for the purpose of making away with the vehicle.

Respecting the front axle, the operator will be saved the annoyance of placing a jack under the axle and facing the danger of ruining his clothes by having his automobile equipped with the foregoing device.

While the construction and arrangement is that of an improved parking device, obviously modifications and changes may be made without departing from the spirit of the invention or the scope of the claims.

I claim:—

1. In combination with an axle and a drag link, a frame hinged to the axle for movement toward the ground, a shaft journaled on the frame, a wheel to touch the ground and cause the lifting of the axle through the frame and its hinge connection when moving the axle in one direction, said wheel having bearing at one end of the shaft to roll in the direction of the length of the axle, and means on the other end of the shaft to couple the shaft with the drag link enabling turning of the shaft hence steering of the wheel.

2. In combination with a drag link and the wheels of an axle at one end of a vehicle, a frame hinged to the axle transversely of the vehicle for movement toward the ground, a shaft journaled on the frame, a wheel to touch the ground and act with the frame through the hinge to lift the axle and said end of the vehicle when rolling the latter in one direction, said wheel having bearing at one end of the shaft to roll in the direction of the length of the axle, and complementary coupling means on the other end of the shaft and the drag link engaging when the vehicle has been lifted to enable steering of said wheel by means of the drag link.

3. A parking device for a wheeled vehicle having an axle and a drag link, a frame hinged to the axle transversely of the vehicle, a shaft journaled on the frame, a wheel having bearing at the lower end of the shaft to roll in the direction of the length of the axle, suspending means for the frame by which the frame can be lowered until the wheel touches the ground, causing a lifting action on the axle and vehicle when rolling the latter in one direction, and complementary coupling means on the other end of the shaft and on the drag link engaging when the axle is lifted.

4. In combination with the steering gear of a wheeled vehicle, a frame mounted on part of the vehicle for movement toward the ground, a wheel to touch the ground and act with the frame to lift the vehicle when rolling the vehicle on its wheels in one direction, wheel-carrying means swivelled on the frame, and means to couple said carrying means with the steering gear during lifting of the vehicle.

5. In combination with the steering gear of a wheeled vehicle, a frame mounted on one end of the vehicle for movement down and up in respect to the vehicle and ground, means connected with the frame and extending to the instrument board of the vehicle for causing the lowering and raising of the frame from the instrument board, a wheel to touch the ground and act with the frame to lift the vehicle when rolling the vehicle on its wheels in one direction, and means swivelly carrying the wheel on the frame, being automatically coupled with the steering gear during lowering of the frame for subsequent steering of said wheels when the respective end of the vehicle is lifted from the ground.

6. In a wheeled vehicle, a steering device to steer the wheels of said vehicle, an auxiliary parking wheel to roll crosswise of the vehicle, and carrying means for the parking wheel being movable to simultaneously jack up the vehicle and make a steering connection with the steering device upon linearly moving the vehicle.

Signed at Jefferson, in the county of Cole and State of Missouri, this 17th day of May A. D. 1929.

RUSSELL WILSON BRANSON.